Dec. 4, 1934. J. L. NOVAK 1,983,185
FILLING TOP FOR SPRAYER TANKS
Filed Oct. 14, 1933
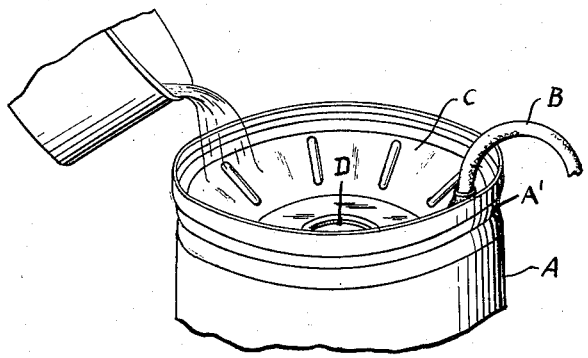
Fig. 1
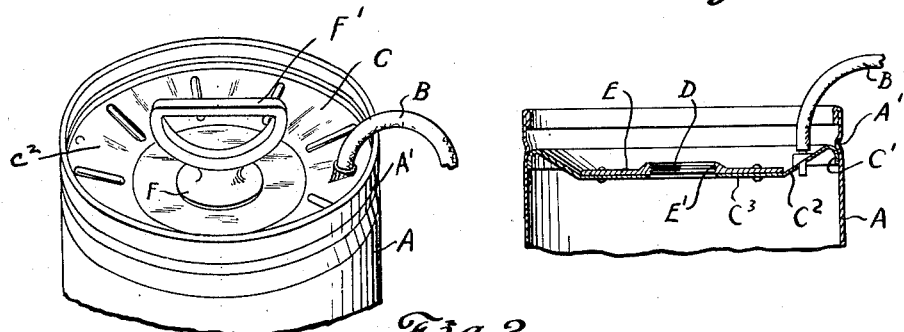
Fig. 3
Fig. 2
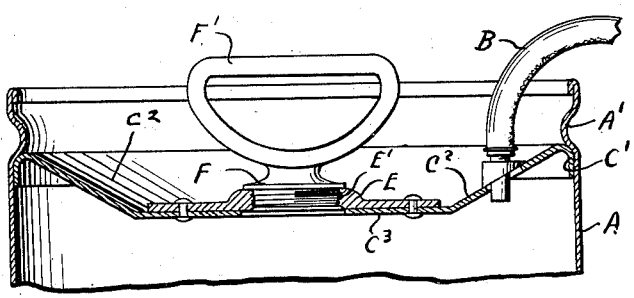
Fig. 4
INVENTOR.
John L. Novak
BY Swan Frye 2nd Hardesty
ATTORNEYS.

Patented Dec. 4, 1934

1,983,185

UNITED STATES PATENT OFFICE 1,983,185

FILLING TOP FOR SPRAYER TANKS

John L. Novak, Traverse City, Mich., assignor to Acmeline Manufacturing Company, Traverse City, Mich., a corporation of Michigan Application October 14, 1933, Serial No. 693,564

5 Claims. (Cl. 220—66)

This invention relates to an improved form of filler top for a container whose frequent refilling becomes necessary, and has for its object an improved construction whereby the tank of a manually portable sprayer mechanism, for example, is so constructed as to render possible its easy refilling without waste, even when the user is in a wind-exposed position, where if an attempt were made to refill the tank through a relatively small aperture, even with the aid of a small funnel, an uncomfortably large proportion of the refilling solution would be unavoidably scattered outside of the guiding range of the funnel and thus lost so far as advantageous use is concerned.

In the drawing:

Figure 1 is a perspective of the top of a cylindrical tank, constructed in accordance with my improvement, and showing a quantity of refilling material in process of being poured thereinto.

Figure 2 is a similar perspective showing the closure cap in place on its seat and partly within the protective bowl formed by the top wall and the adjacent edges of the side wall.

Figure 3 is a sectional elevational view taken through the center of the improved top and bringing out the variance in level between the top edge of the tank and the filling aperture.

Figure 4 is a similar sectional view bringing out the possibility of a combined carrying and closure piece, the handle being at least partially included within the filling space of the top of the tank and thus out of the way accordingly.

A represents the preferably cylindrical side wall of a portable container designed to be equipped with a suitable hose connection B leading to a sprayer nozzle (not shown), with whose details the present disclosure need not be concerned. Whatever form of the latter may be used, the supply of liquid to be atomizingly projected upon shrubs, fruit trees, or the like, needs frequent refilling in the case of a supply tank of such size as to be easily carried around by the user, and it has therefore been the custom to effect the filling thereof through a relatively small cap-closed aperture, into which the tapered small end of a funnel is temporarily inserted. Not only does the carrying around of a funnel, plus the additional supply of spraying fluid, as well as the spraying tank itself, involve considerable inconvenience, but since the refilling of the tank must often occur in an open field, it has been my experience that even with the aid of a funnel, if indeed that may be made to stay in place in the filling aperture, a considerable quantity of the refilling material is dissipatingly lost by the action of wind.

In the present invention, therefore, I have, without appreciable sacrifice of the tank's capacity, provided an upper end wall thereof C, which is of generally truncated conical form, and the peripheral edge C' of which is made to fit under and cooperatively with an inbent bead A' in the side wall of the container, adequately below the top edge of the latter, so that together with the sloping wall portions $C^2$ of the end wall, a sort of bowl effect is produced, which quite effectively shields all material below the upper peripheral edge from the action of wind, while the vertical side walls above the bead A' combined with the sloping portion $C^2$ of the end wall produce a centripetal flow of fluid or even powdered material poured thereinto toward the comparatively large filling aperture D which is located axially concentric with the walls of the body portion of the tank A. Thus no matter how rapidly refilling material is poured into the tank it is protected from the wind while being carried into the refill aperture D, while the size of the latter is such as to preclude any overflow accumulation of the refill material within the conical bowl thus formed. The exact angularity or slope of the portions $C^2$ of the end wall may be varied as desired from the contouring here illustrated so long as it is adequate to guide the flow of the spraying material through the aperture D; but in case a markedly lesser angularity is chosen, the protection against wind afforded by the location of the aperture D below the level of the top edge of the side wall A can be retained by selection of the height thereabove to which this latter is extended.

The end wall C may of course be made of such strength that no reinforcement is necessary about the central refill aperture D, but in case it is desired to use relatively thin material for this end wall, the flat bottom portion $C^3$ may, if desired, be reinforced by the riveted or otherwise secured positioning thereover of a centrally apertured plate E which in such case may, as illustrated particularly in Figure 3, be made to carry most of the threadings E' for the fluid-tight closure of the filling aperture by means of the cap F, which, as I have illustrated, is preferably provided with a portage handle F', which though usually of such a size as to project above the level of the top edge of the side wall A, has such a proportion of its height accounted for by the depth of the dished construction formed by the conical end wall of the top edges of the side wall, that its extent beyond the level of the latter is of comparatively negligible degree and makes for a very compact assemblage of the tank unit as a whole.

What I claim is:

1. In combination with a generally cylindrical tank, an end wall therefor adapted to facilitate the filling thereof by protectively shielding material in process of introduction thereinto from dispersive wind influence, comprising a centrally apertured member contoured into truncated conical form with its edges secured to the side wall of the container adequately below the top edge thereof to cooperatively therewith form a bowl which constantly serves to guide material poured thereinto toward the central aperture.

2. In combination with a generally cylindrical container, a centrally apertured end closure piece therefor contoured into truncated conical form with its marginal edge attached to the interior surface of the side wall of the tank adequately below the top edge thereof to cooperatively form a protective material-receiving and guiding bowl, said central aperture being adapted to be closed by the suitably anchored positioning therein of a closure member when the filling of the tank has been completed.

3. An inset end wall and refilling construction for a generally cylindrical tank, comprising a centrally apertured disk contoured into truncated conical form whose marginal edge is secured to the terminally projecting side wall of the tank appreciably below the top edge thereof, thus cooperatively therewith forming a protective fluid-guiding bowl whose poured-in contents are adapted to flow through said central aperture into the interior of the tank, the edges of the material surrounding the aperture being screw-threaded for the removable positioning therein of a correspondingly threaded closure member.

4. A fluid-guiding end wall for facilitating the repeated refilling of a tank, comprising a centrally apertured plate fashioned into the form of a truncated cone whose peripheral edge is attached to the terminally projecting side wall of the tank adequately below the upper edge thereof to form an inwardly sloping bowl structure adapted to shield material poured thereinto from dispersive wind influence while guiding the same toward and through the central aperture therein.

5. In combination with a cylindrical tank, an end wall therefor having its marginal edges attached to the interior surface of the tank's side wall spacedly from the terminal edges thereof, said end wall being dished into truncated conical form, whereby there is formed cooperatively with the surrounding terminal edges of the side wall a wind-protected space adapted for the reception of a quantity of poured-in material, and the central portion of said dished end wall being apertured for facilitating the progress of such poured-in material into the interior of the tank and for the temporary positioning of a closure member thereover.

JOHN L. NOVAK.